(12) United States Patent
Yoshikawa

(10) Patent No.: US 7,878,060 B2
(45) Date of Patent: Feb. 1, 2011

(54) MOTION SENSOR AND METHOD OF MANUFACTURING THE SAME

(75) Inventor: Ryoichi Yoshikawa, Kagoshima (JP)

(73) Assignee: Sony Corporation, Tokyo (JP)

( * ) Notice: Subject to any disclaimer, the term of this patent is extended or adjusted under 35 U.S.C. 154(b) by 448 days.

(21) Appl. No.: 11/737,410

(22) Filed: Apr. 19, 2007

(65) Prior Publication Data

US 2008/0148849 A1 Jun. 26, 2008

(30) Foreign Application Priority Data

Apr. 21, 2006 (JP) .......................... P2006-118157

(51) Int. Cl.
G01P 15/125 (2006.01)
G01P 9/04 (2006.01)
(52) U.S. Cl. ............... 73/504.04; 73/504.12; 73/514.32
(58) Field of Classification Search ............. 73/504.04, 73/504.12, 514.32
See application file for complete search history.

(56) References Cited

U.S. PATENT DOCUMENTS

2005/0242413 A1* 11/2005 Yarita et al. ................. 257/595

FOREIGN PATENT DOCUMENTS

| JP | 04-299227 | 10/1992 |
|---|---|---|
| JP | 10-227644 | 8/1998 |
| JP | 2001-349732 | 12/2001 |
| JP | 2004-144598 | 5/2004 |
| JP | 2004-361394 | 12/2004 |
| JP | 2006-053125 | 2/2006 |

OTHER PUBLICATIONS

Japanese Office Action issued on Apr. 8, 2008.
Yoshiyuki Watanabe et al.; 5-Axis Motion Sensor with SOI Structure Using Resonant Drive and Non-Resonant Detection Mode; Proceedings of the 21st Sensor Symposium, 2004; pp. 379-383.

* cited by examiner

Primary Examiner—John E Chapman
(74) Attorney, Agent, or Firm—SNR Denton US LLP

(57) ABSTRACT

A micromachine includes a movable section formed of a conductor and a support section formed of a conductor, wherein the movable section and the support section are separated from each other, an insulating layer is provided on the conductor, a conductive layer is provided on the insulating layer, and the conductive layer is formed so as to straddle the movable section and the support section.

3 Claims, 12 Drawing Sheets

MOTION SENSOR AND METHOD OF MANUFACTURING THE SAME

CROSS REFERENCES TO RELATED APPLICATIONS

The present invention contains subject matter related to Japanese Patent Application JP 2006-118157 filed in the Japanese Patent Office on Apr. 21, 2006, the entire contents of which being incorporated herein by reference.

BACKGROUND OF THE INVENTION

1. Technical Field

The present invention relates to a motion sensor for detecting angular velocities and accelerations.

2. Related Art

In the past, three-axis acceleration sensors for detecting accelerations in three axes, namely X, Y, and Z axes utilizing capacitances have been used (see, for example, JP-A-4-299227 (first patent document)). Further, angular velocity sensors for detecting angular velocities utilizing capacitances have similarly been used in the past (see, for example, JP-A-10-227644 (second patent document)).

In resent years, motion sensors such as acceleration sensors capable of detecting accelerations or angular velocity sensors capable of detecting angular velocities have been used for, for example, detecting hand tremor of digital cameras, and have increased in demands therefor. In particular, small-sized motion sensors are in high demand, and motion sensors utilizing capacitances attract attention as the motion sensors which can be downsized and are simple in structure.

In general, the motion sensors utilizing capacitances each have a plumb section as a moving electrode movably supported by beam sections having elasticity and a fixed electrode section distant from the plumb section, thus detecting the acceleration acting on the plumb section by detecting the displacement of the plumb section by the fixed electrode section.

Further, in recent days, five-axis motion sensors (hereinafter referred to as "five-axis motion sensors") capable of simultaneously detecting accelerations in directions of three axes, namely X, Y, and Z axes and angular velocities of two axes have been proposed (see, for example, JP-A-2004-144598 (third patent document)). In particular, the five-axis motion sensor disclosed in "5-Axis Motion Sensor with SOI Structure Using Resonant Drive and Non-Resonant Detection Mode" in the proceedings of "The 21st Sensor Symposium on Sensors, Micromachine and Applied Systems," pp. 379-383 (first non-patent document) has a structure which can easily be evacuated inside thereof containing a vibrator, and in addition, has an advantage of being formed by an etching process.

Specifically, the penta-axial motion sensor of the first non-patent document is provided with the vibrator (the plumb section), as the moving electrode movably supported by the beam sections having elasticity, formed between a lower glass substrate having first electrode sections and an upper glass substrate having second electrode sections using an intermediate substrate of a three-layered structure composed of a first conductive layer, an insulating layer, and a second conductive layer, and detects the displacement of the vibrator by the first and second electrodes, thus detecting the acceleration and the angular velocity acting on the vibrator.

Further, the inside of the motion sensor containing the vibrator can easily be evacuated by anodically bonding the upper glass substrate and the lower glass substrate respectively with the intermediate substrate including the vibrator. In addition, since it is sufficient to keep the vibrator formed of the intermediate substrate with predetermined distances from the upper and lower glass substrates, it becomes possible to form the five-axis motion sensor by an etching process.

Hereinafter, the structure of the five-axis motion sensor according to the first non-patent document will more specifically be described. FIG. 20 is a diagram showing the structure of the five-axis motion sensor 100 of the related art.

As shown in FIG. 20, the five-axis motion sensor 100 of the related art is composed of a lower substrate 200 having first electrode sections 201, an upper substrate 400 having second electrode sections 401, and an intermediate substrate 300 formed between the lower substrate 200 made of glass and the upper substrate 400 also made of glass, and a vibrator (the plumb section) 302 as the moving electrode movably supported by elastic beam sections 301, a support section 303 for supporting the beam sections 301, and conducting sections 304a through 304e each for extracting the first electrode sections 201 to the upper substrate 400 are formed using the intermediate substrate 300.

It should be noted here that a so-called silicon-on-insulator (SOI) substrate composed of a first conductive layer 320 formed of a silicon conductive layer, an insulating layer 321 formed of a silicon oxide insulating layer ($SiO_2$), and a second conductive layer 322 formed of a silicon conductive layer is used as the intermediate substrate 300.

The first electrode sections 201 are provided with a plurality of fixed electrodes 210a through 210d for detecting the displacement of the vibrator 302 and a drive electrode 210e for moving the vibrator 302 disposed on the inside surface 220 of the lower substrate 200.

Further, the second electrode sections 401 are provided with a plurality of fixed electrodes 410a through 410d for detecting the displacement of the vibrator 302 and a drive electrode 410e for moving the vibrator 302 disposed on the inside surface 420 of the upper substrate 400.

Still further, each of the electrodes 210a through 210e of the first electrode sections is provided with a wiring extracted to the upper substrate 400 through the intermediate substrate 300. Specifically, a plurality of conducting sections 304a through 304e for respectively extracting the electrodes 210a through 210e from the lower substrate 200 to the upper substrate 400 is formed between the lower substrate 200 and the upper substrate 400 with the intermediate substrate 300.

The upper substrate 400 is provided with through holes 415a through 415j formed from the inside surface 420 to the outside surface 430 thereof, wherein the through holes 415a through 415e are connected to the conducting sections 304a through 304e for extracting the electrodes 210a through 210e of the lower substrate 200, respectively. Further, the through holes 415f through 415j are respectively connected to the electrodes 410a through 410e of the upper substrate 400.

As described above, the five-axis motion sensor 100 has the detection electrodes 210a through 210d, 410a through 410d, and the drive electrodes 210e and 410e extracted to electrodes (not shown) formed on the outside surface 430 of the upper substrate 400.

It should be noted that the vibrator 302 and the conducting sections 304a through 304e are formed separated from each other to be physically insulated for maintaining electrical effects.

Since the vibrator 302 is arranged to face each of the detection electrodes 210a through 210d and 410a through 410d with a predetermined gap, capacitors C101 through C108 (not shown; the capacitors C101 through C104 are formed between the detection electrodes 210a through 210d and vibrator 302, the capacitors C105 through C108 are formed between the detection electrodes 410a through 410d and the vibrator 302, respectively) are formed. Then, the capacitances of the capacitors C101 through C108 vary in response to the displacement of the vibrator 302. Therefore, the displacement of the vibrator 302 can be detected by detecting the capacitances of the capacitors C101 through C108.

The operation of the five-axis motion sensor 100 thus configured as described above will specifically be explained with reference to the drawings. FIGS. 21A and 21B, which are cross-sectional views along the AA-BB line shown in FIG. 20, are diagrams for explaining the principle of detecting accelerations and angular velocities in the five-axis motion sensor 100. It should be noted that the Y-axis direction is assumed to be perpendicular to the drawing sheet.

The drive electrodes 210e and 410e of the five-axis motion sensor 100 are supplied with alternating voltages having phases reversed from each other. The frequency of each of the alternating voltages is the resonant frequency of the vibrator 302, and the vibrator 302 oscillates in the Z-axis direction of FIG. 20 in the resonant frequency.

When acceleration is caused in the Z-axis direction in the vibrator 302, force Fz is caused along the Z-axis direction as shown in FIG. 21A to move the vibrator. When the vibrator is thus moved along the Z-axis, the distances between the electrodes 210a through 210d and the vibrator 302 are enlarged while reducing the capacitances of the capacitors C105 through C108. Further, the distances between the electrodes 410a through 410d and the vibrator 302 are reduced while increasing the capacitances of the capacitors C101 through C104.

Still further, when acceleration is caused in the Y-axis direction, force Fy is caused to make the vibrator 302 incline as shown in FIG. 21B. When the vibrator is thus moved along the Y-axis, the distances between the electrodes 210a, 210d, 410a, and 410d and the vibrator 302 are reduced while increasing the capacitances of the capacitors C101, C104, C105, and C108. Further, the distances between the electrodes 210b, 210c, 410b, and 410c and the vibrator 302 are enlarged while reducing the capacitances of the capacitors C102, C103, C106, and C107.

Therefore, the displacement of the vibrator 302 can be detected by detecting the capacitances of the capacitors C101 through C108, and as a result, the acceleration caused in the vibrator 302 can be detected.

Further, in the vibrator 302, the angular velocity around the Y-axis can be detected by detecting the Coriolis force acting in the X-axis direction, and the angular velocity around the X-axis can be detected by detecting the Coriolis force acting in the Y-axis direction. The Coriolis force can be detected by detecting the displacement of the vibrator 302 similarly to the case of detection of the acceleration, and detection of the Coriolis force acting on the X-axis direction, for example, can be performed by detecting the displacement of the vibrator 302 in the X-axis direction.

Further, the five-axis motion sensor 100 can be manufactured by the following manufacturing method. FIGS. 22A through 22E are diagrams for explaining the manufacturing process of the five-axis motion sensor 100 of the related art.

As shown in FIG. 22A, the intermediate substrate 300 composed of a first conductive layer 320, an insulating layer 321, and a second conductive layer 322 is provided with dimples 330 formed by the insulating materials, and is further provided with openings for connecting sections 331 for establishing conduction between the first conductive layer 320 and the second conductive layer 322 formed by etching.

Subsequently, as shown in FIG. 22B, deep reactive ion etching (DRIE) is performed on the first conductive layer 320 to form a lower area 302-1 of the vibrator 302, a lower area 303-1 of the support section 303, and lower areas 304a-1 through 304e-1 of the conducting sections 304a through 304e separately from each other. Further, the conducting sections 304a through 304e are provided with the connecting sections 331 for respectively connecting the lower areas 304a-1 through 304e-1 and the upper areas 304a-2 through 304e-2 with conductive materials.

After then, as shown in FIG. 22C, the lower substrate 200 previously provided with a dimple sections 202 and the first electrode sections 201 is provided, and the first conductive layer 320 of the intermediate substrate 300 is anodically bonded with the inner surface of the lower substrate 200.

Further, as shown in FIG. 22D, DRIE is performed on the second conductive layer 322 to form the beam sections 301, an upper area 302-2 of the vibrator 302, an upper area 303-2 of the support section 303, and upper areas 304a-2 through 304e-2 of the conducting sections 304a through 304e.

In this case, DRIE is performed on the second conductive layer 322 so that connections are provided between the upper area 302-2 of the vibrator 302 and the beam sections 301, and between the beam sections 301 and the upper area 303-2 of the support section 303, and also the upper area 302-2 of the vibrator 302 is disposed above the lower area 302-1 of the vibrator 302, the upper area 303-2 of the support section 303 is disposed above the lower area 303-1 of the support section 303, and the upper areas 304a-2 through 304e-2 of the conducting sections 304a through 304e are respectively disposed above the lower areas 304a-1 through 304e-1 of the conducting sections 304a through 304e.

Further, as shown in FIG. 22E, the upper substrate 400 previously provided with the second electrode sections 401 and so on is prepared, and the intermediate substrate 300 and the upper substrate 400 are anodically bonded with each other so that the inside surface 430 of the upper substrate 400 faces the upper surface of the intermediate substrate 300.

SUMMARY OF THE INVENTION

In the five-axis motion sensor 100 according to the first non-patent document, the vibrator 302 and the conducting sections 304a through 304e are formed physically separated from each other to maintain electrically isolated conditions, and accordingly, it has been quite difficult to perform all of the wafer processes prior to the anodic bonding with the lower substrate 200 and the upper substrate 400.

Specifically, the wafer process of isolating the vibrator 302 and the conducting sections 304a through 304e from each other is performed after anodically bonding the intermediate substrate 300 with the lower substrate 200.

Therefore, there is caused a problem of interfusion of Na+ (sodium ion) to the first conductive layer 320 from the lower substrate 200, which is a glass substrate.

Further, since DRIE needs to be performed in the condition in which the intermediate substrate 300 is bonded with the lower substrate 200, there is a possibility of weakening the cooling effect to degrade the stability of etching process.

Further, the pressure difference from the enclosed space between the lower substrate 200 and the intermediate substrate 300 caused when bonding the intermediate substrate 300 with the lower substrate 200 might cause breakage when DRIE is performed on the second conductive layer 322. In particular, there is a great possibility of breakage right before penetrating the second conductive layer 322.

In addition, after bonding the lower substrate 200 with the intermediate substrate 300, the residual disposition process after the etching process becomes difficult, and a problem might be caused in the anodic bonding of the upper substrate 400 and the intermediate substrate 300.

According to an embodiment of the invention, there is provided a micromachine including a movable section formed of a conductor and a support section formed of a conductor, wherein the movable section and the support section are separated from each other, an insulating layer is provided on the conductor, a conductive layer is provided on the insulating layer, and the conductive layer is formed so as to straddle the movable section and the support section.

According to another embodiment of the invention, there is provided a motion sensor including: a lower substrate having a first electrode section; an upper substrate having a second electrode section; a vibrator movably supported by an elastic beam section and formed of an intermediate substrate having a three-layered structure composed of a first conductive layer, an insulating layer, and a second conductive layer between the lower substrate and the upper substrate; a support section formed of the first conductive layer, the insulating layer, and the second conductive layer, and supporting the beam section; and a conducting section formed of the first conductive layer, the insulating layer, and the second conductive layer, electrically isolated from the support section, and extracting the first electrode section to the upper substrate, whereby displacement of the vibrator is detected by the first electrode section and the second electrode section to detect at least one of angular velocity and acceleration, wherein the conducting section is supported by the second conductive layer extending from the support section.

Further, according to another embodiment of the invention, there is provided a method of manufacturing a motion sensor including a lower substrate having a first electrode section, an upper substrate having a second electrode section, a vibrator movably supported by an elastic beam, a support section for supporting the beam, and a conducting section for extracting the first electrode section to the upper substrate formed using an intermediate substrate having a three-layered structure composed of a first conductive layer, an insulating layer, and a second conductive layer between the lower substrate and the upper substrate, whereby displacement of the vibrator is detected with the first electrode section and the second electrode section to detect at least one of angular velocity and acceleration, the method including the steps of: patterning the first conductive layer to form a lower area of the vibrator, a lower area of the support section, and a lower area of the conducting section separated from each other, the step of patterning the second conductive layer to form an area of the beam section and an upper area of the vibrator, and to form an upper area of the support section and an upper area of the conducting section so as to be electrically isolated from each other, and so that either one of the upper area of the support section and the upper area of the conducting section extends from above the lower area of the support section to above the lower area of the conducting section, and the step of bonding the lower substrate and the upper substrate with the intermediate substrate.

According to the embodiment of the invention, since there is provided a micromachine including a movable section formed of a conductor and a support section formed of a conductor, wherein the movable section and the support section are separated from each other, an insulating layer is provided on the conductor, a conductive layer is provided on the insulating layer, and the conductive layer is formed so as to straddle the movable section and the support section, the movable section is supported by the conductive layer, thus the structure for fixing the movable section in the manufacturing process can be eliminated to make the manufacturing of the micromachine easier, and further the compatibility with manufacturing of semiconductor devices in semiconductor manufacturing lines can be improved.

According to the embodiment of the invention, since there is provided a motion sensor provided with a vibrator movably supported by an elastic beam section and formed of an intermediate substrate having a three-layered structure composed of a first conductive layer, an insulating layer, and a second conductive layer between a lower substrate having a first electrode section and an upper substrate having a second electrode section, thereby detecting displacement of the vibrator by the first electrode section and the second electrode section to detect one of angular velocity and acceleration, including a support section formed of the first conductive layer, the insulating layer, and the second conductive layer, and for supporting the beam section, and a conducting section formed of the first conductive layer, the insulating layer, and the second conductive layer, electrically isolated from the support section, and for extracting the first electrode section to the upper substrate, wherein the conducting section is supported by the second conductive layer extending from the support section, the manufacturing quality of the motion sensor can be improved. Specifically, since the intermediate substrate can be bonded with the lower substrate and the upper substrate after the vibrator, the beam sections, the support section, and the conducting sections are provided to the intermediate substrate, possibilities of interfusion of Na+, breakage caused by the pressure difference, and so on can be eliminated.

According to the embodiment of the invention, since there is provided a method of manufacturing a motion sensor having, between a lower substrate having a first electrode section and an upper substrate having a second electrode section, a vibrator movably supported by an elastic beam, a support section for supporting the beam, and a conducting section for extracting the first electrode section to the upper substrate formed using an intermediate substrate having a three-layered structure composed of a first conductive layer, an insulating layer, and a second conductive layer and for detecting a displacement of the vibrator with the first electrode section and the second electrode section to detect at least one of angular velocity and acceleration, including the step of patterning the first conductive layer to form a lower area of the vibrator, a lower area of the support section, and a lower area of the conducting section separated from each other, the step of patterning the second conductive layer to form an area of the beam section and an upper area of the vibrator, and to form an upper area of the support section and an upper area of the conducting section so as to be electrically isolated from each other, and so that either one of the upper area of the support section and the upper area of the conducting section extends from above the lower area of the support section to above the lower area of the conducting section, and the step of bonding the lower substrate and the upper substrate with the intermediate substrate, the manufacturing quality of the motion sensor can be improved. Specifically, since the intermediate substrate can be bonded with the lower substrate and the upper substrate after the vibrator, the beam sections, the support section, and the conducting sections are provided to the intermediate substrate, possibilities of interfusion of Na+, breakage caused by the pressure difference, and so on can be eliminated.

DESCRIPTION OF THE EMBODIMENTS

Figure 1:
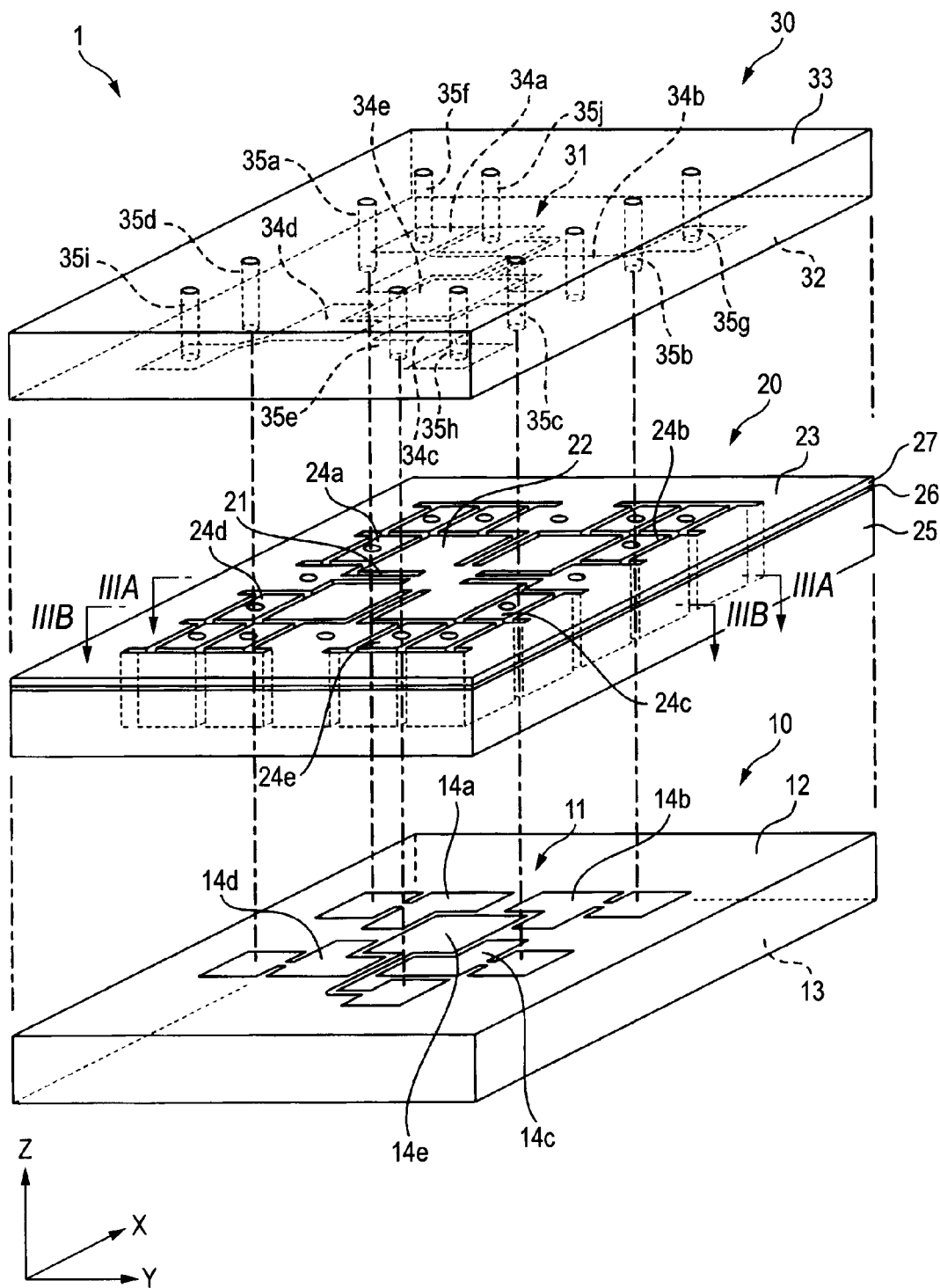
FIG. 1 is an exploded view of a motion sensor of the present embodiment.

A motion sensor according to the present embodiment is a motion sensor provided with a vibrator movably supported by elastic beam sections and formed of an intermediate substrate having a three-layered structure composed of a first conductive layer, an insulating layer, and a second conductive layer between a lower substrate having first electrode sections and an upper substrate having second electrode sections, thereby detecting displacement of the vibrator by the first electrode sections and the second electrode sections to detect the angular velocity or the acceleration.

Further, the motion sensor is provided with a support section formed of the first conductive layer, the insulating layer, and the second conductive layer and for supporting the beam sections and conducting sections formed of the first conductive layer, the insulating layer, and the second conductive layer, electrically isolated from the support section, and for extracting the first electrode sections to the upper substrate.

In this case, since the conducting sections are supported by the first conductive layer or the second conductive layer extending from the support section, the vibrator, the beam sections, the support section, and the conducting sections can integrally be formed without being separated from each other.

As a result, the manufacturing quality of the motion sensor can be improved. Specifically, since the intermediate substrate can be bonded with the lower substrate and the upper substrate after the vibrator, the beam sections, the support section, and the conducting sections are provided to the intermediate substrate, possibilities of interfusion of Na+, breakage caused by the pressure difference, and so on can be eliminated.

Further, it is possible to arrange that the conducting sections are supported by the first conductive layer and the second conductive layer extending from the conducting sections to the support section instead of the first conductive layer and the second conductive layer extending from the support section.

A method of manufacturing a motion sensor according to the present embodiment is for forming the vibrator movably supported by the elastic beams, the support section for supporting the beams, and the conducting sections for extracting the first electrode sections to the upper substrate between the lower substrate having the first electrode sections and the upper substrate having the second electrode sections using the intermediate substrate having the three-layered structure composed of the first conductive layer, the insulating layer, and the second conductive layer as described below.

That is, the first conductive layer is patterned to form a lower area of the vibrator, a lower area of the support section, and lower areas of the conducting sections so as to be separated from each other.

Further, the second conductive layer is patterned to form areas of the beam sections and an upper area of the vibrator, and in addition, to form an upper area of the support section and upper areas of the conducting sections so as to be electrically isolated from each other, and further, so that the upper area of the support section or the upper areas of the conducting sections extend from above the lower area of the support section to above the lower areas of the conducting sections. After then, the lower substrate and the upper substrate are bonded with the intermediate substrate.

As a result, the manufacturing quality of the motion sensor can be improved. Specifically, since the intermediate substrate is bonded with the lower substrate and the upper substrate after the vibrator, the beam sections, the support section, and the conducting sections are provided to the intermediate substrate, possibilities of interfusion of Na+, breakage caused by the pressure difference, and so on can be eliminated.

Further, the same advantage can be obtained by forming the beam sections, the vibrator, the support section, and the conducting sections as follows.

That is, the second conductive layer is patterned to form the areas of the beam sections and the upper area of the vibrator, and at the same time, to form the upper area of the support section and the upper areas of the conducting sections so as to be electrically isolated from each other.

Then, the first conductive layer is patterned to form the lower area of the vibrator, the lower area of the support section, and the lower areas of the conducting sections so as to be separated from each other, and in addition, to form the lower area of the support section or the lower areas of the conducting sections so as to extend from below the upper area of the support section to below the upper areas of the conducting sections. After then, the lower substrate and the upper substrate are bonded with the intermediate substrate.

Figure 2:
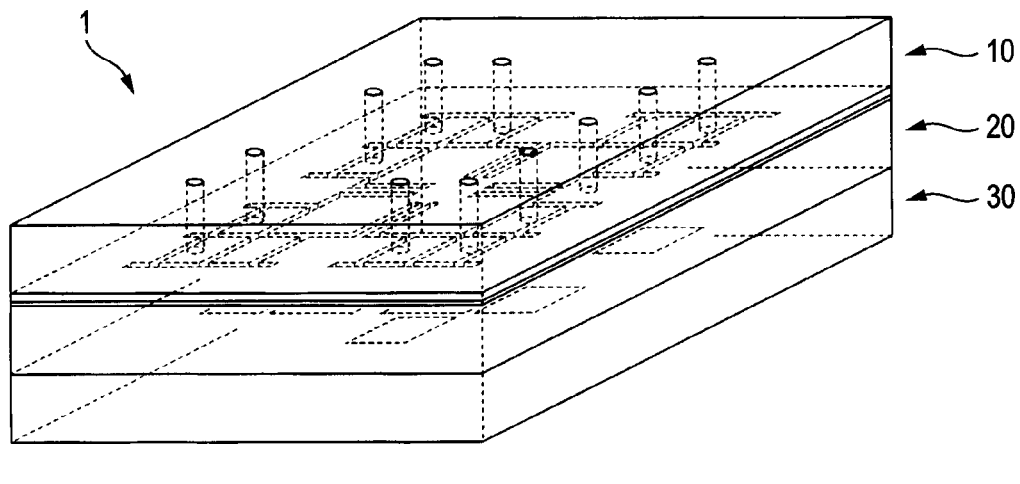
FIG. 2 is a partial transparent perspective view of the motion sensor shown in FIG. 1.
Figure 2:
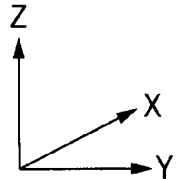
Figure 3A:
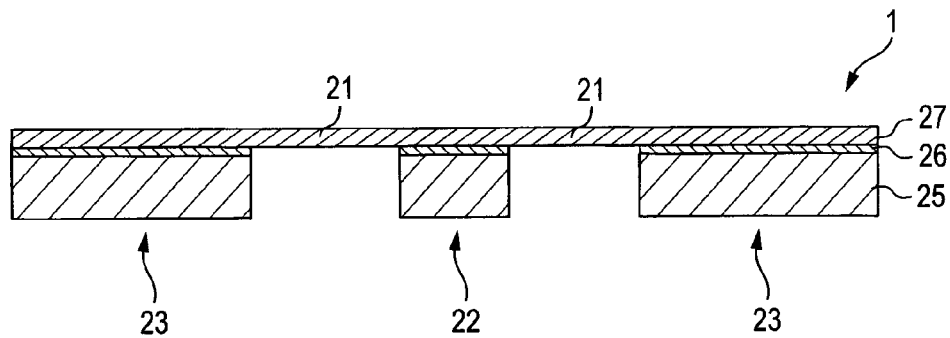
FIG. 3A is a cross-sectional view of the motion sensor shown in FIG. 1 along the A-A line.
Figure 3B:
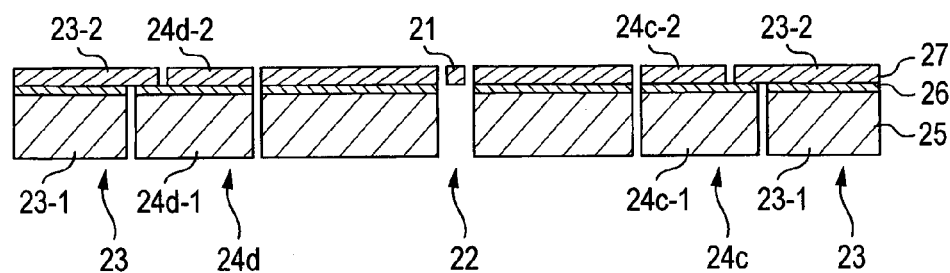
FIG. 3B is a cross-sectional view of the motion sensor shown in FIG. 1 along the B-B line.

Hereinafter, the embodiment of the invention will be explained further specifically with reference to the drawings. It should be noted that explanations will be presented in the present embodiment exemplifying a motion sensor 1 capable of simultaneously detecting accelerations in the directions of three axes, namely the X, Y, and Z axes, and angular velocities around two axes. FIG. 1 is an exploded view of the motion sensor 1 of the present embodiment, FIG. 2 is a partial transparent perspective view of the motion sensor 1 of the present embodiment, FIG. 3A is a cross-sectional view along the A-A line shown in FIG. 1, and FIG. 3B is a cross-sectional view along the B-B line shown in FIG. 1.

As shown in FIG. 1, the five-axis motion sensor 1 (hereinafter referred to as "motion sensor 1") according to the present embodiment is provided with a lower substrate 10 having first electrode sections 11, an upper substrate 30 having second electrode sections 31, and an intermediate substrate 20 forming a vibrator (a plumb section) 22 as the moving electrode movably supported by a plurality of elastic beam sections 21, a support section 23 for supporting the beam sections 21, and conducting sections 24a through 24e for extracting the first electrode sections 11 to the upper substrate 30 between the lower substrate 10 and the upper substrate 30.

It should be noted here that a so-called silicon-on-insulator (SOI) substrate composed of a first conductive layer 25 formed of a silicon conductive layer, an insulating layer 26 formed of a silicon oxide insulating layer ($SiO_2$), and a second conductive layer 27 formed of a silicon conductive layer is used as the intermediate substrate 20.

As the first electrode sections 11, there are provided on the inside surface 12 of the lower substrate 10 a plurality of detection electrodes 14a through 14d for detecting the displacement of the vibrator 22 and a drive electrode 14e for moving the vibrator 22.

Further, as the second electrode sections 31, there are provided on the inside surface 32 of the upper substrate 30 a plurality of detection electrodes 34a through 34d for detecting the displacement of the vibrator 22 and a drive electrode 34e for moving the vibrator 22.

Still further, each of the electrodes 14a through 14e of the first electrode sections is provided with a wiring extracted to the upper substrate 30 through the intermediate substrate 20. In other words, a plurality of conducting sections 24a through 24e for respectively extracting the electrodes 14a through 14e from the lower substrate 10 to the upper substrate 30 is formed between the lower substrate 10 and the upper substrate 30 with the intermediate substrate 20.

The upper substrate 30 is provided with through holes 35a through 35j formed from the inside surface 32 to the outside surface 33 thereof, wherein the through holes 35a through 35e are connected to the conducting sections 24a through 24e for extracting the electrodes 14a through 14e of the lower substrate 10, respectively. Further, the through holes 35f through 35j are respectively connected to the electrodes 34a through 34e of the upper substrate 30. Still further, although not shown in the drawings, the through holes 35a through 35j are respectively connected to a plurality of electrodes provided on the outside surface 33 of the upper substrate 30 with which the motion sensor 1 is used.

As described above, the motion sensor 1 has the detection electrodes 14a through 14d, 34a through 34d, and the drive electrodes 14e and 34e extracted to the electrodes formed on the outside surface 33 of the upper substrate 30.

It should be noted here that the vibrator 22 and the conducting sections 24a through 24e are formed separated from each other to be physically insulated for maintaining electrical effects.

In other words, as shown in FIG. 3B, the conducting sections 24c, 24d (the same applies to the conducting sections 24a, 24b, and 24e) and the support section 23 are formed of the first conductive layer 25, the insulating layer 26, and the second conductive layer 27, and moreover the conducting sections are electrically isolated from the support section 23.

Further, the conducting sections 24c, 24d (the same applies to the conducting sections 24a, 24b, and 24e) are separately supported by the second conductive layer 27 extending from the support section 23.

Specifically, upper areas 24c-2, 24d-2 of the conducting sections 24c, 24d and a part of an upper area 23-2 of the support section 23 are respectively disposed above lower areas 24c-1, 24d-1 of the conducting sections 24c, 24d via the insulating layer 26. Further, the lower areas 24c-1, 24d-1 of the conducting sections 24c, 24d are distant from a lower area 23-1 of the support section 23 with a predetermined gap so as to be arranged to maintain the electrical isolation.

In other words, the upper areas 24c-2, 24d-2 of the conducting sections 24c, 24d are electrically isolated from the upper area 23-2 of the support section 23, and the lower areas 24c-1, 24d-1 of the conducting sections 24c, 24d are also electrically separated from the lower area 23-1 of the support section 23, and further, the upper area 23-2 of the support section 23 is formed so as to extend from above the lower area 23-1 of the support section 23 to above the lower areas 24c-1, 24d-1 of the conducting sections 24c, 24d. It should be noted that the same applies to the conducting sections 24a, 24b, and 24e.

It should also be noted here that the supporting method of the conducting sections 24a through 24e by the support section 23 is not limited to the method of supporting by the second conductive layer 27 (the upper area 23-2 of the support section 23) extending from the support section 23 as shown in FIG. 3B.

Figure 4:
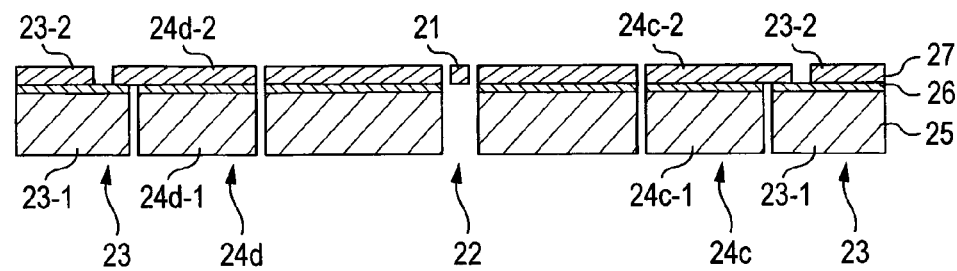
FIG. 4 is a cross-sectional view of another motion sensor of the present embodiment along the B-B line.

For example, as shown in FIG. 4, the conducting sections 24c, 24d (the same applies to the conducting sections 24a, 24b, and 24e) can be supported by the first electrode 25 (the lower area 23-1 of the support section 23) extending from the support section 23.

Specifically, the lower areas 24c-1, 24d-1 of the conducting sections 24c, 24d and a part of the lower area 23-1 of the support section 23 are disposed below the upper areas 24c-2, 24d-2 of the conducting sections 24c, 24d. Further, the lower areas 24c-1, 24d-1 of the conducting sections 24c, 24d are distant from the lower area 23-1 of the support section 23 with a predetermined gap so as to be arranged to maintain the electrical isolation. The upper areas 24c-2, 24d-2 of the conducting sections 24c, 24d are also distant from the upper area 23-2 of the support section 23 with a predetermined gap so as to be arranged to maintain the electrical isolation.

In other words, the upper areas 24c-2, 24d-2 of the conducting sections 24c, 24d are electrically isolated from the upper area 23-2 of the support section 23, and the lower areas 24c-1, 24d-1 of the conducting sections 24c, 24d are also electrically separated from the lower area 23-1 of the support section 23, and further, the lower area 23-1 of the support section 23 is formed so as to extend from below the upper area 23-2 of the support section 23 to below the upper areas 24c-2, 24d-2 of the conducting sections 24c, 24d. It should be noted that the same applies to the conducting sections 24a, 24b, and 24e.

As described above, in the motion sensor 1 according to the present embodiment, the conducting sections 24a through 24e are supported by the support section 23 while maintaining the conducting sections 24a through 24e electrically isolated from the support section 23, thus integrally forming the beam sections 21, the vibrator 22, the support section 23 and the conducting sections 24a through 24e without being separated from each other.

Therefore, the manufacturing quality of the motion sensor can be improved. Specifically, since the intermediate substrate is bonded with the lower substrate and the upper substrate after the vibrator, the beam sections, the support section, and the conducting sections are provided to the intermediate substrate, the possibilities of the interfusion of Na+, the breakage caused by the pressure difference, and so on can be eliminated.

It should be noted here that the vibrator 22 is arranged to face each of the detection electrodes 14a through 14d, 34a through 34d with a predetermined gap, thus capacitors C1 through C8 (not shown) are formed respectively. Then, the capacitances of the capacitors C1 through C8 vary in response to the displacement of the vibrator 22. Therefore, the displacement of the vibrator 22 can be detected by detecting the capacitances of the capacitors C1 through C8.

The drive electrodes 14e and 34e of the motion sensor 1 are supplied with alternating voltages having phases reversed from each other. The frequency of each of the alternating voltages is the resonant frequency of the vibrator 22, and the vibrator 22 oscillates in the Z-axis direction of FIG. 1 in the resonant frequency.

Similarly to the motion sensor 100 of the related art, if the acceleration is caused in the Z-axis direction in the vibrator 22, the vibrator oscillates along the Z-axis. Further, if the acceleration is caused in the X-axis direction or the Y-axis direction, the vibrator 22 is inclined. Therefore, the acceleration caused in the vibrator 22 can be detected by detecting the displacement of the vibrator 22.

Further, in the vibrator 22, the angular velocity around the Y-axis can be detected by detecting the Coriolis force acting in the X-axis direction, and the angular velocity around the X-axis can be detected by detecting the Coriolis force acting in the Y-axis direction. The Coriolis force can be detected by detecting the displacement of the vibrator 22, and detection of the Coriolis force acting on the X-axis direction can be performed by, for example, detecting the displacement of the vibrator 22 in the X-axis direction.

Figure 5:
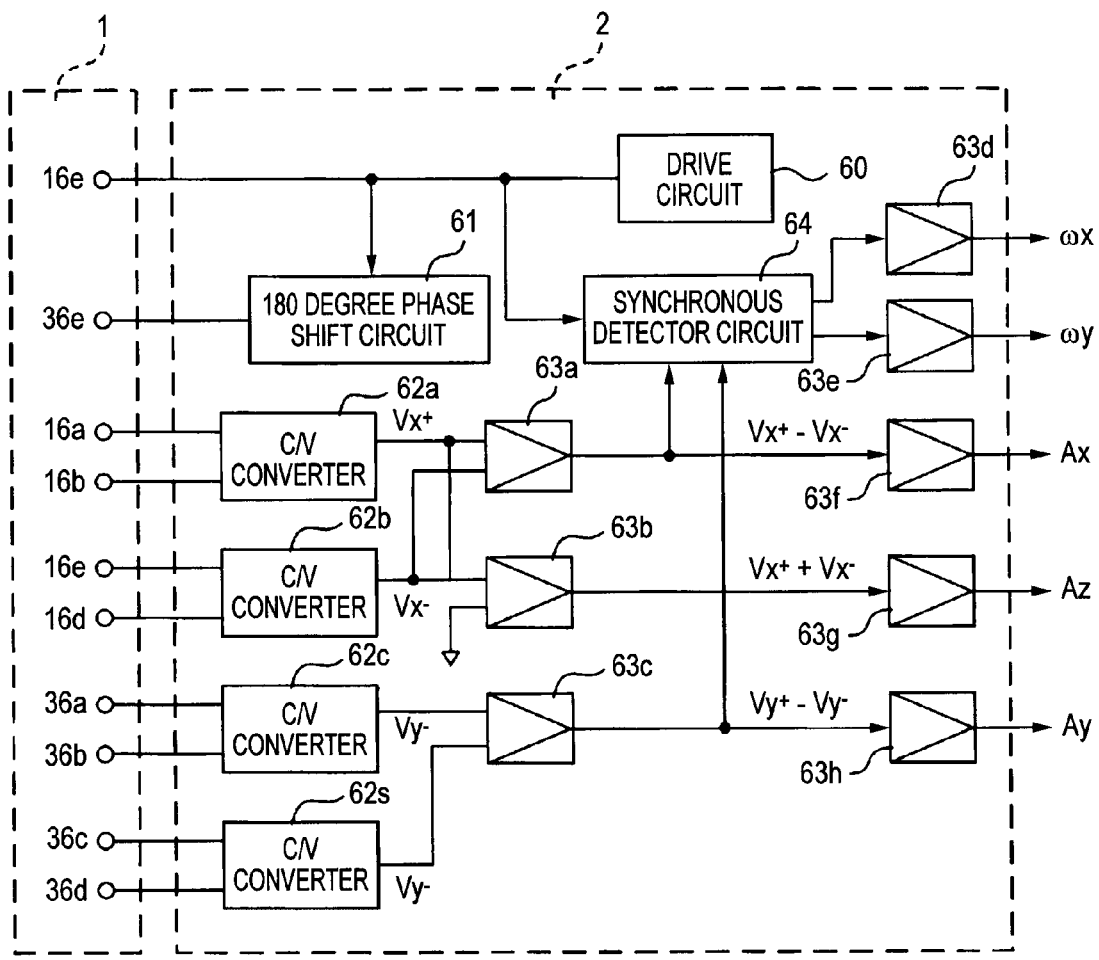
FIG. 5 is a block diagram of an acceleration/angular velocity detection circuit using the motion sensor shown in FIG. 1.

Hereinafter, the detection operation of the acceleration and the angular velocity using the motion sensor 1 will further specifically be explained with reference to the drawings. FIG. 5 is a block diagram of an acceleration/angular velocity detection circuit 2 using the motion sensor 1.

The acceleration/angular velocity detection circuit 2 includes a drive circuit 60, a 180-degree phase shift circuit 61, capacitance/voltage (C/V) converters 62a through 62d, amplifiers 63a through 63h, and a synchronous detector circuit 64.

The drive circuit 60 generates an alternating voltage with a frequency causing the resonance of the vibrator 22, and applies the voltage to the drive electrode 16e of the motion sensor 1. Further, the alternating voltage output from the drive circuit 60 is inverted in the phase by the 180-degree phase shift circuit 61, and is applied to the drive electrode 36e of the motion sensor 1. The vibrator 22 oscillates at the resonant frequency in the Z-axis direction in the drawing in response to the application of the alternating voltages inverted from each other to the drive electrode 16e, 36e.

The C/V converters 62a through 62d convert a capacitance Cx+ (capacitances C1+C2), a capacitance Cx− (capacitances C3+C4), a capacitance Cy+ (capacitances C5+C6), and a capacitance Cy− (capacitances C7+C8) into voltages Vx+, Vx−, Vy+, and Vy−, respecively.

The voltages Vx+, Vx−, Vy+, and Vy− are respectively input to the amplifiers 63a through 63c. Specifically, the amplifier 63a receives the voltages Vx+, Vx−, and outputs the difference value [(Vx+)−(Vx−)] therebetween. The amplifier 63c receives the voltages Vy+, Vy−, and outputs the difference value [(Vy+)−(Vy−)] therebetween. The amplifier 63b receives the voltages Vx+, Vx−, and outputs the additional value [(Vx+)+(Vx−)] thereof.

The values [(Vx+)−(Vx−)], [(Vx+)+(Vx−)], and [(Vy+)−(Vy−)] output from the amplifiers 63a through 63c are respectively amplified by the amplifiers 63f through 63h, and output as an X-axis direction acceleration signal Ax, a Z-axis direction acceleration signal Az, and a Y-axis direction acceleration signal Ay, respectively.

Further, the values [(Vx+)−(Vx−)] and [(Vy+)−(Vy−)] output from the amplifiers 63a, 63c are input to the synchronous detector circuit 64, output from the drive circuit 60, and are further output as angular velocities ωx, ωy via the amplifiers 63d, 63e, respectively.

Hereinafter, an example of a method of manufacturing the motion sensor 1 according to the present embodiment will specifically be explained with reference to the drawings. FIGS. 6 through 19, which are cross-sectional views along the A-A line shown in FIG. 1, are diagrams for explaining a manufacturing process of the motion sensor according to an embodiment.

Figure 6:
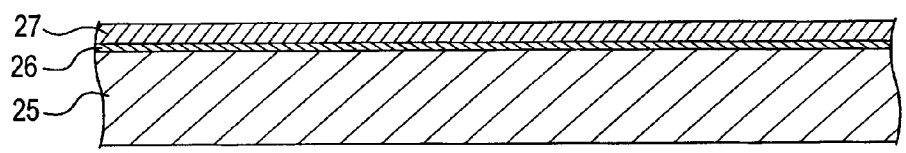
FIG. 6 is a diagram for explaining a process of manufacturing a motion sensor according to an embodiment.

Firstly, as shown in FIG. 6, there is prepared the intermediate substrate 20 having a three-layered structure in which the first conductive layer 25 formed of a silicon conductive layer, the insulating layer 26 formed of a silicon oxide insulating layer, and the second conductive layer 27 formed of a silicon conductive layer are sequentially formed. It should be noted that the silicon conductive layer is formed by doping impurities in a silicon layer.

Here, what is generally used as an SOI substrate can be used as the three-layered structure substrate composed of the silicon conductive layer, the silicon oxide insulating layer, and the silicon conductive layer. As described above, by using the three-layered structure substrate such as an SOI substrate as the intermediate substrate 20, the beam sections 21 can be formed with an accurate thickness.

Figure 7:
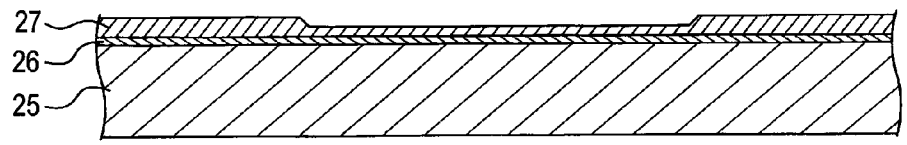
FIG. 7 is a diagram for explaining the process of manufacturing a motion sensor according to the embodiment.

Subsequently, as shown in FIG. 7, the thickness of a part of the second conductive layer 27 in which the beam sections 21 and the upper area 22-2 of the vibrator 22 are formed is adjusted by wet-etching the second conductive layer 27 using a resist mask (not shown) on which predetermined patterning has been executed.

Figure 8:
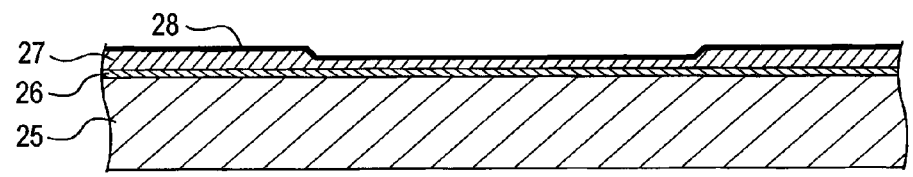
FIG. 8 is a diagram for explaining the process of manufacturing a motion sensor according to the embodiment.
Figure 9:
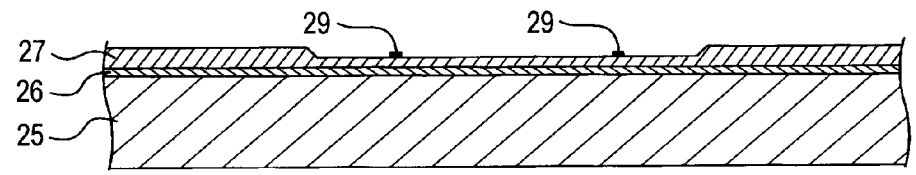
FIG. 9 is a diagram for explaining the process of manufacturing a motion sensor according to the embodiment.

Further, an insulating layer 28 is formed using a plasma CVD method as shown in FIG. 8, and dimples 29 formed of the insulating layer are formed at a plurality of positions by an etching process using a mask as shown in FIG. 9.

Figure 10:
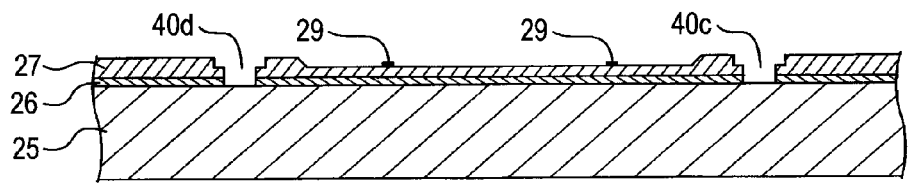
FIG. 10 is a diagram for explaining the process of manufacturing a motion sensor according to the embodiment.

Subsequently, as shown in FIG. 10, in order for forming the conducting sections 24a through 24e for providing electrical connection between the first conductive layer 25 and the second conductive layer 27, through holes 40a through 40e reaching the portions to become the lower areas 24a-1 through 24e-1 of the conducting sections 24a through 24e are formed at the portions to become the upper areas 24a-2 through 24e-2 of the conducting sections 24a through 24e by etching using a mask.

Figure 11:
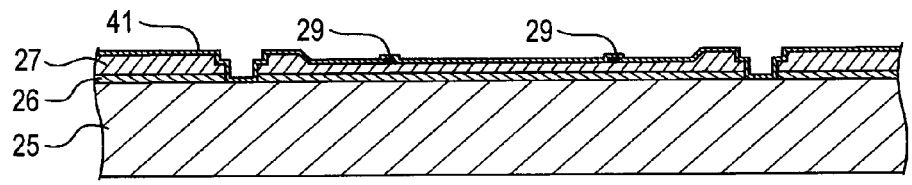
FIG. 11 is a diagram for explaining the process of manufacturing a motion sensor according to the embodiment.
Figure 12:
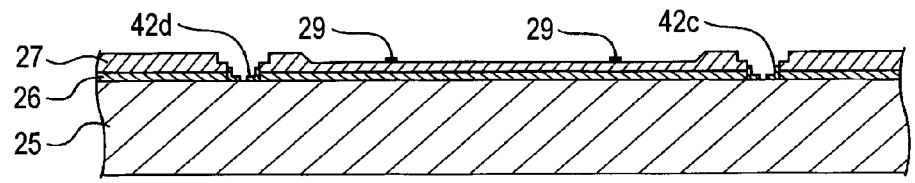
FIG. 12 is a diagram for explaining the process of manufacturing a motion sensor according to the embodiment.

Then, as shown in FIG. 11, a metal film 41 made of metal such as aluminum is formed on the surface of the first conductive layer 25 using an evaporation method or a sputter method. Further, as shown in FIG. 12, the metal film 41 deposited on the second conductive layer 27 is removed by etching from the entire area except the peripheries of the through holes 40a through 40e, thus forming connecting sections 42a through 42e.

Figure 13:
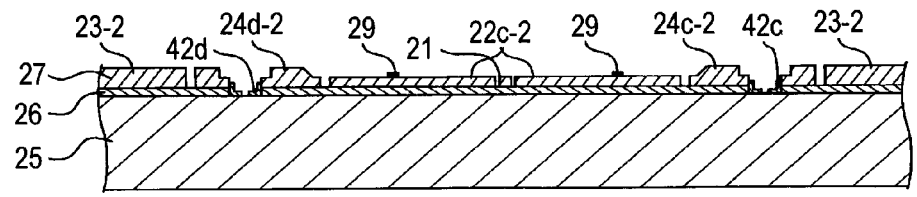
FIG. 13 is a diagram for explaining the process of manufacturing a motion sensor according to the embodiment.

After then, as shown in FIG. 13, deep reactive ion etching (DRIE) is performed from the side of the second conductive layer 27 to form areas of the beam sections 21, an upper area 22-2 of the vibrator 22, an upper area 23-2 of the support section 23, and upper areas 24a-2 through 24e-2 of the conducting sections 24a through 24e in the second conductive layer 27.

In this case, the upper area 23-2 of the support section 23 and each of the upper areas 24a-2 through 24e-2 of the conducting sections 24a through 24e are distant from each other with a predetermined distance so as to be electrically isolated. It should be noted that the areas of the beam sections 21, the upper area 22-2 of the vibrator 22, and the upper area 23-2 of the support section 23 are formed integrally without separation so as to be electrically connected.

Specifically, the second conductive layer 27 is patterned to form the areas of the beam sections 21 and the upper area 22-2 of the vibrator 22, and also to form the upper area 23-2 of the support section 23 and the upper areas 24a-2 through 24e-2 of the conducting sections 24a through 24e so as to electrically isolate the upper areas 24a-2 through 24e-2 of the conducting sections 24a through 24e from the upper area 23-2 of the support section 23.

Figure 14:
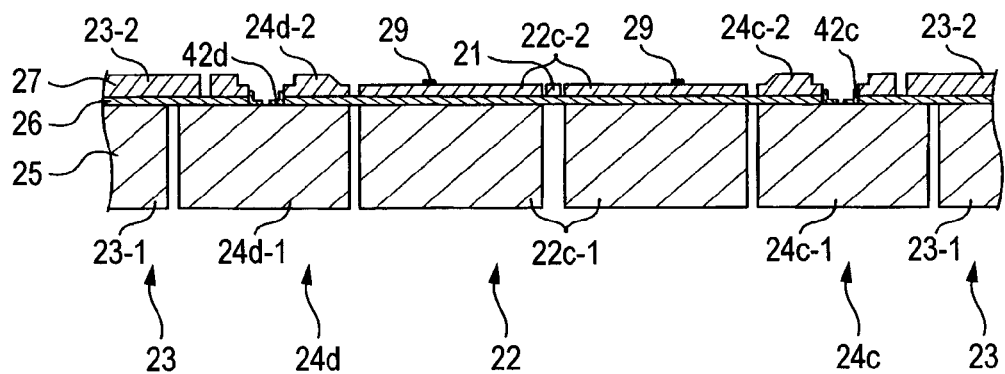
FIG. 14 is a diagram for explaining the process of manufacturing a motion sensor according to the embodiment.

Subsequently, as shown in FIG. 14, deep reactive ion etching (DRIE) is performed from the side of the first conductive layer 25 to form a lower area 22-1 of the vibrator 22, a lower area 23-1 of the support section 23, and lower areas 24a-1 through 24e-1 of the conducting sections 24a through 24e separately from each other in the side of the first conductive layer 25.

Here, it is arranged that both of the lower area 23-1 of the support section 23 and a part of the lower areas 24a-1 through 24e-1 of the conducting sections 24a through 24e are arranged below the upper area 23-2 of the support section 23 when forming the lower area 23-1 of the support section 23 and the lower areas 24a-1 through 24e-1 of the conducting sections 24a through 24e separately from each other.

Specifically, the first conductive layer 25 is patterned to separate the lower area 22-1 of the vibrator 22, the lower area 23-1 of the support section 23, and the lower areas 24a-1 through 24e-1 of the conducting sections 24a through 24e from each other, and also to form the lower areas 24a-1 through 24e-1 of the conducting sections 24a through 24e so as to extend from below the upper areas 24a-2 through 24e-2 of the conducting sections 24a through 24e to below the upper area 23-2 of the support section 23. FIG. 14 shows that the lower areas 24c-1, 24d-1 of the conducting sections 24c, 24d are formed so as to extend from below the upper areas 24c-2, 24d-2 of the conducting sections 24c, 24d to below the upper area 23-2 of the support section 23.

It should be noted that the lower area 23-1 of the support section 23 can be formed so as to extend from below the upper area 23-2 of the support section 23 to below the upper areas 24a-2 through 24e-2 of the conducting sections 24a through 24e as shown in FIG. 4. In other words, it is sufficient that the conducting sections 24a through 24e are supported by either the upper area 23-2 or the lower area 23-1 of the support section 23.

It should be noted that if an etching method non-corrosive to silicon oxide and corrosive to silicon is adopted as the DRIE, the insulating layer 26 functions as a stopper, thus it becomes possible to etch only the first conductive layer 25 or the second conductive layer 27.

Figure 15:
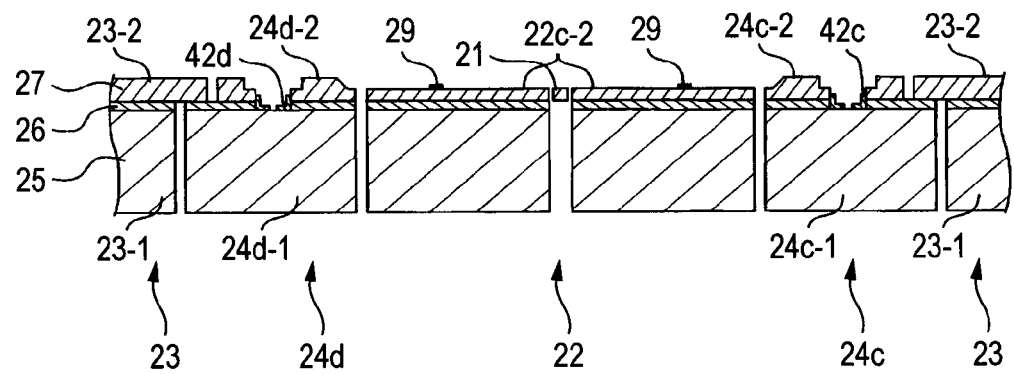
FIG. 15 is a diagram for explaining the process of manufacturing a motion sensor according to the embodiment.
Figure 16:
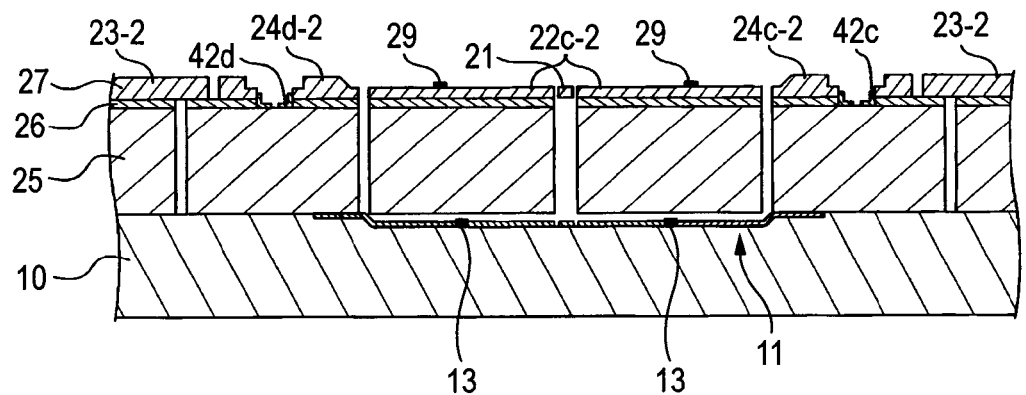
FIG. 16 is a diagram for explaining the process of manufacturing a motion sensor according to the embodiment.

Subsequently, parts of the insulating layer 26 below the beam sections 21 and parts of the insulating layer 26 existing among the vibrator 22, the support section 23, and the conducting sections 24a through 24e are removed by etching as shown in FIG. 15.

After then, the lower substrate 10 previously provided with the first electrode sections 11 and the dimple sections 13 is prepared, and is anodically bonded with the intermediate substrate 20 (see FIG. 15) thus processed as described above as shown in FIG. 16.

Figure 17:
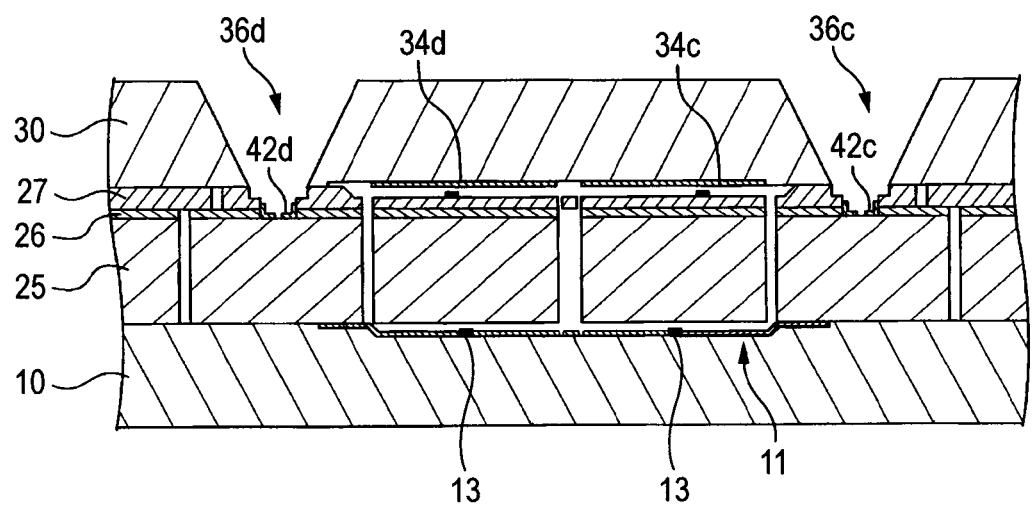
FIG. 17 is a diagram for explaining the process of manufacturing a motion sensor according to the embodiment.

Subsequently, the upper substrate 30 provided with openings 36a through 36j for forming through holes 35a through 35j, the second electrode sections 31a through 31e, and so on is prepared, and is anodically bonded with the intermediate substrate 20 (see FIG. 16) bonded with the lower substrate 10 as shown in FIG. 17.

Figure 18:
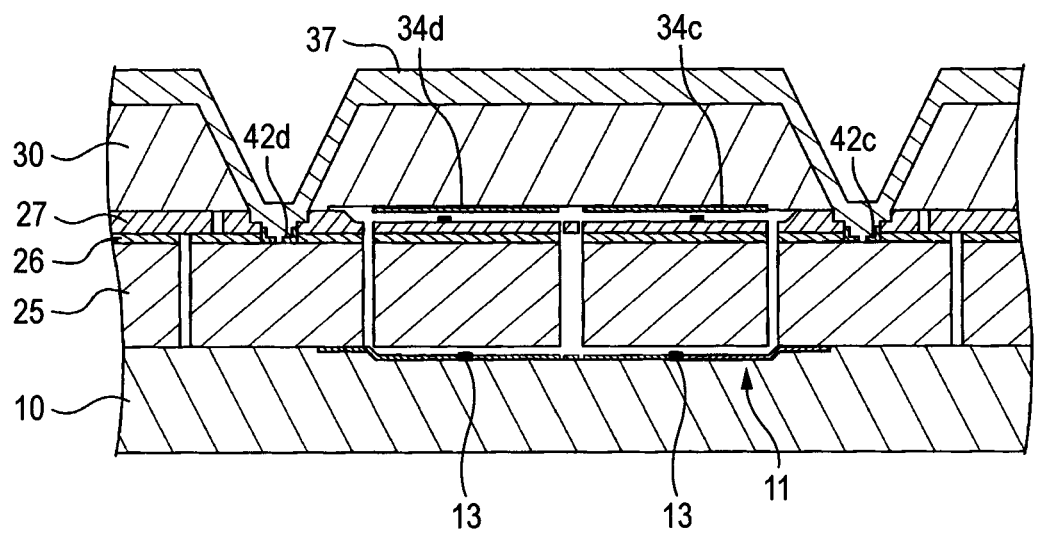
FIG. 18 is a diagram for explaining the process of manufacturing a motion sensor according to the embodiment.

After then, the metal film 37 made of metal such as aluminum or the like is formed as shown in FIG. 18 using an evaporation method or a sputter method, so that the metal film 37 and the connecting sections 42a through 42e are bonded with each other.

Figure 19:
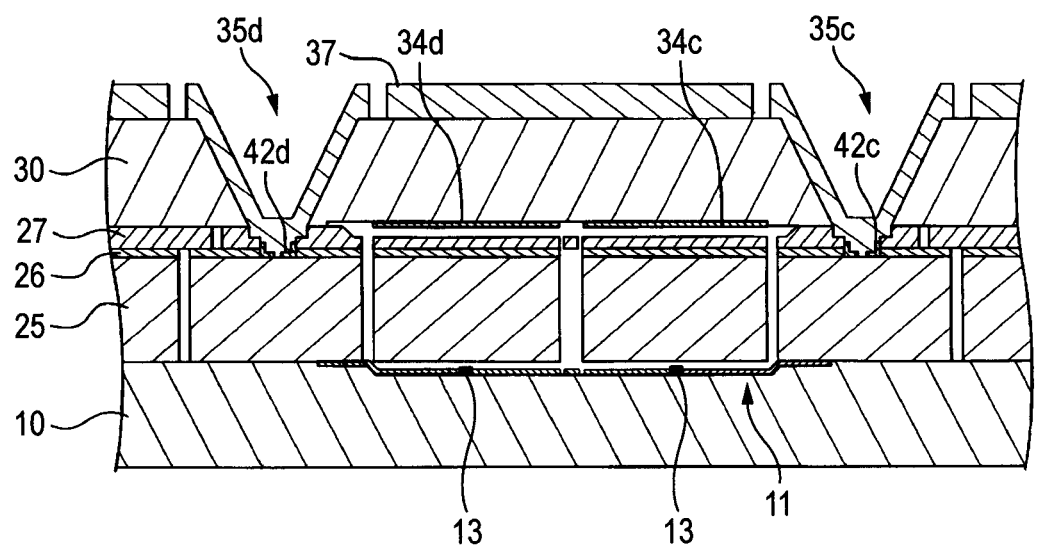
FIG. 19 is a diagram for explaining the process of manufacturing a motion sensor according to the embodiment.
Figure 20:
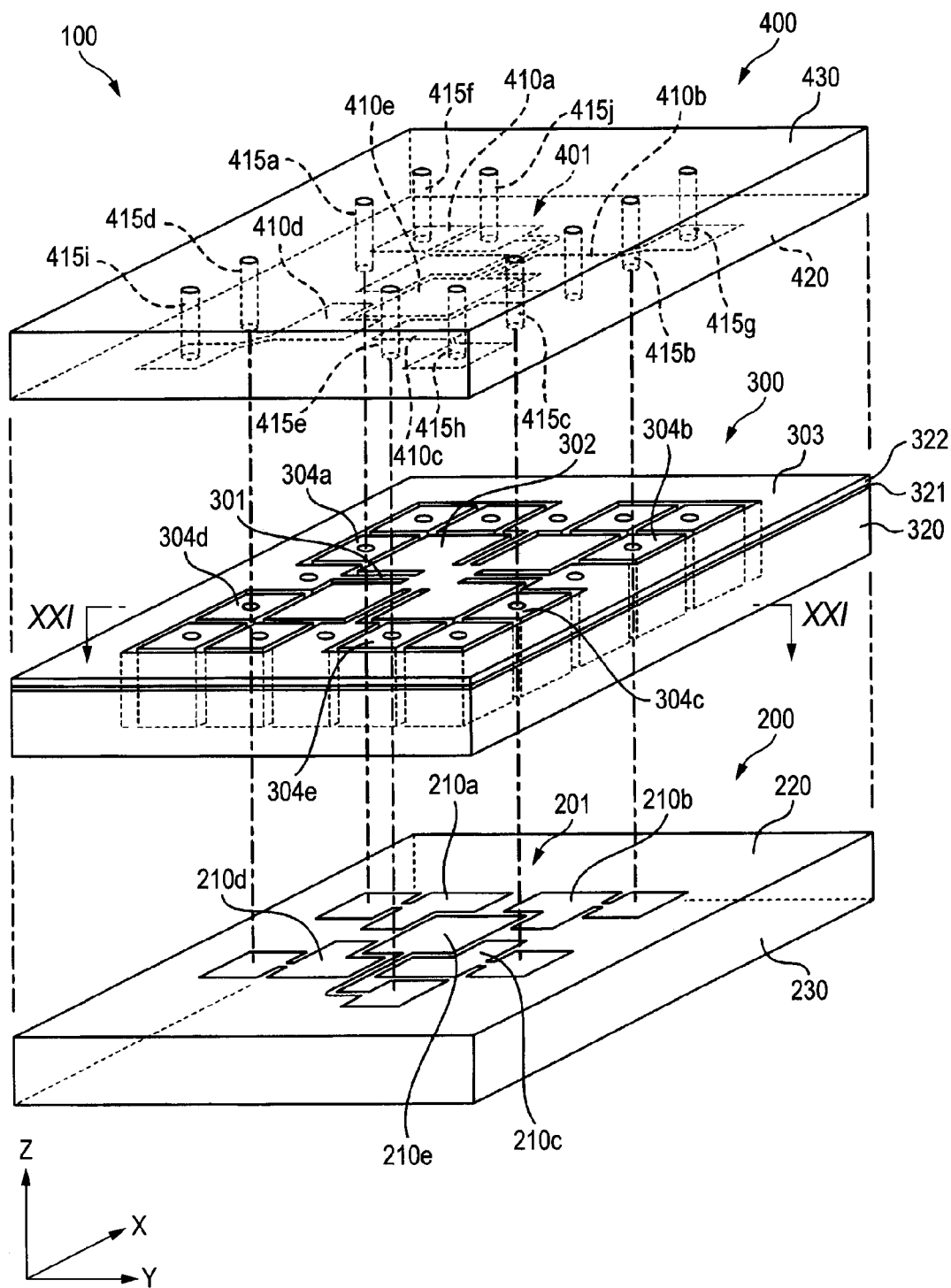
FIG. 20 is a diagram showing the structure of a motion sensor of the related art.
Figure 21A:
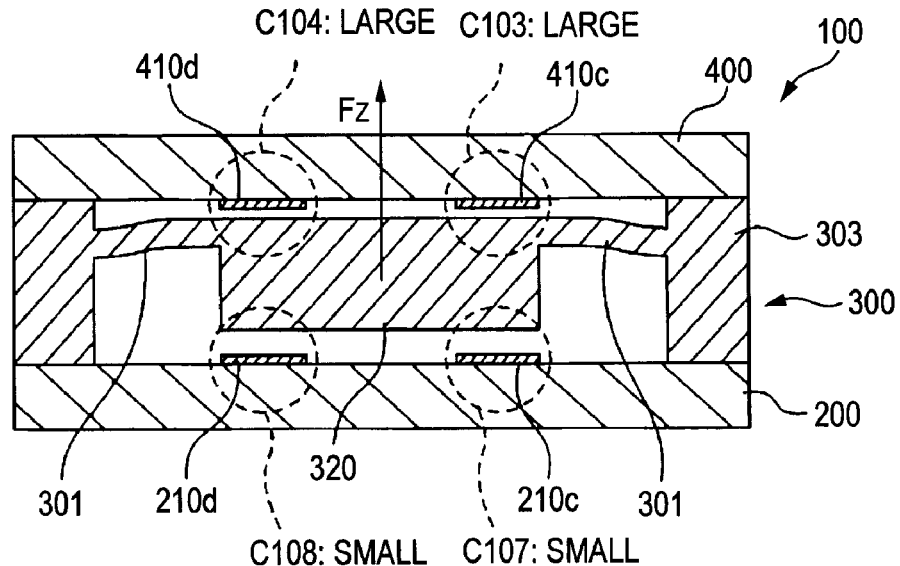
FIGS. 21A and 21B are diagrams for explaining the principle of detecting acceleration and angular velocity of the motion sensor of the related art.
Figure 21B:
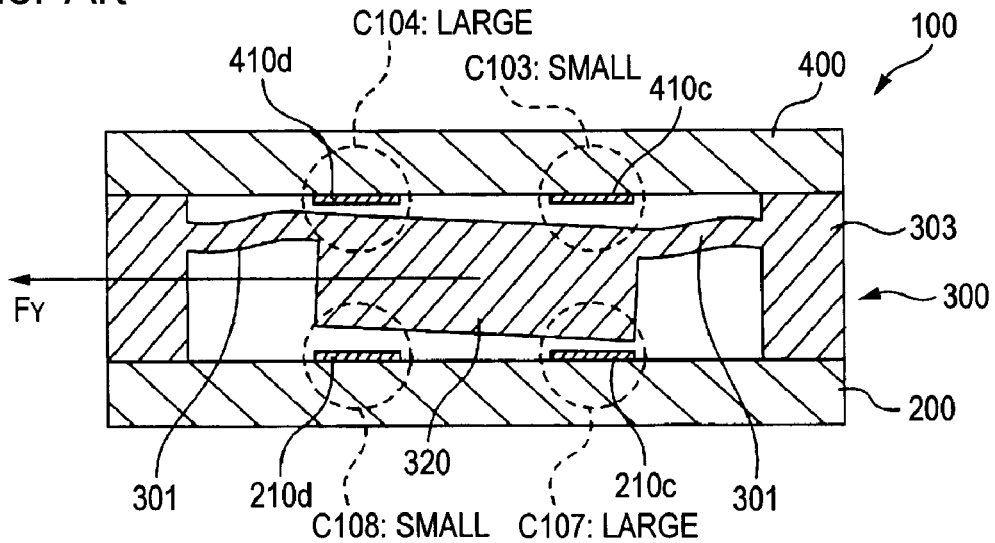
Figure 22A:
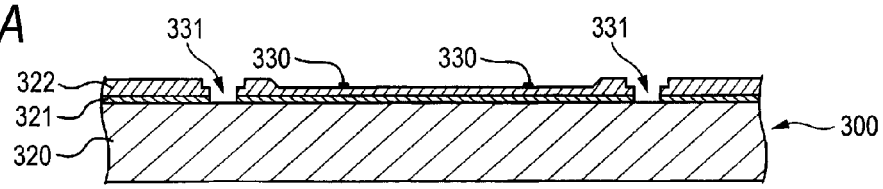
FIGS. 22A through 22E are diagrams for explaining a process of manufacturing the motion sensor of the related art.
Figure 22B:
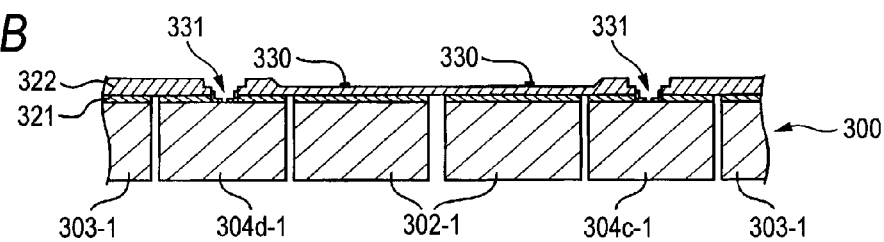
Figure 22C:
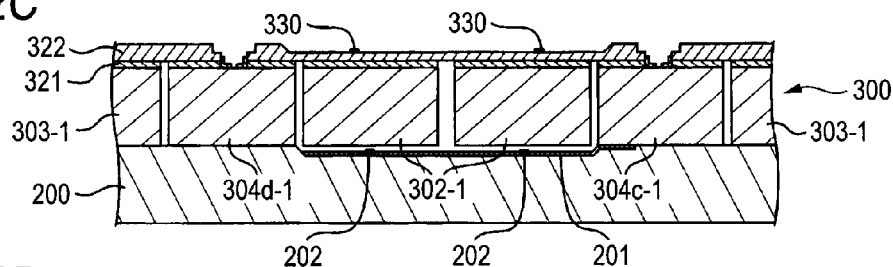
Figure 22D:
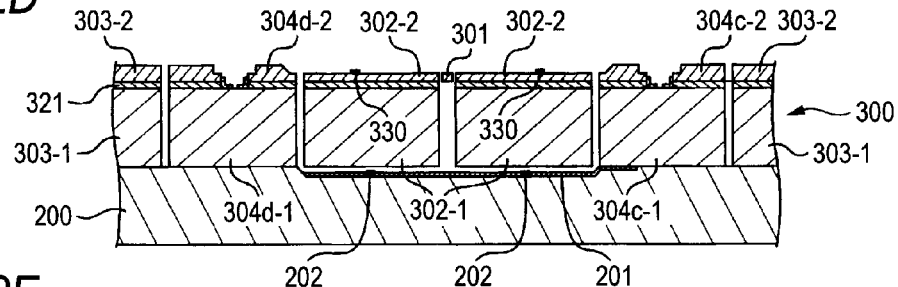
Figure 22E:
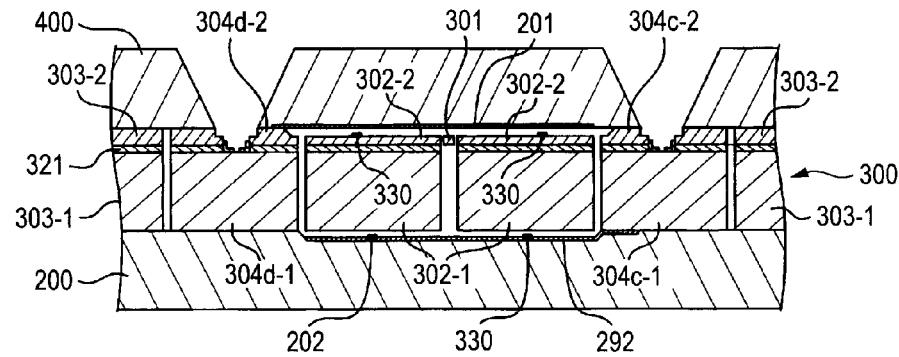

Further, as shown in FIG. 19, the metal film 37 is partially removed using a mask to form the through holes 35a through 35j.

As described above, according to the manufacturing process of the motion sensor 1 of the present embodiment, since the bonding process with the lower substrate 10 and the upper substrate 30 is performed after the wafer process of the intermediate substrate 20, the possibilities of the interfusion of Na+, the breakage caused by the pressure difference, and soon can be eliminated, thus the manufacturing quality of the motion sensor can be improved.

In the embodiment described above, although the second conductive layer 27 is patterned to form the areas of the beam sections 21, the upper area 22-2 of the vibrator 22, the upper area 23-2 of the support section 23, and the upper areas 24a-2 through 24e-2 of the conducting sections 24a through 24e so as to electrically isolate the upper areas 24a-2 through 24e-2 of the conducting sections 24a through 24e from the upper area 23-2 of the support section 23, and then the first conductive layer 25 is patterned to separate the lower area 22-1 of the vibrator 22, the lower area 23-1 of the support section 23, and the lower areas 24a-1 through 24e-1 of the conducting sections 24a through 24e from each other, and also to form the lower areas 24a-1 through 24e-1 of the conducting sections 24a through 24e so as to extend from below the upper areas 24a-2 through 24e-2 of the conducting sections 24a through 24e to below the upper area 23-2 of the support section 23, the support section 23 and the conducting sections 24a through 24e can also be formed as described below.

For example, the first conductive layer 25 is patterned to form the lower area 22-1 of the vibrator 22, the lower area 23-1 of the support section 23, and the upper areas 24a-2 through 24e-2 of the conducting sections 24a through 24e separately from each other. Then, the second conductive layer 27 is patterned to form the areas of the beam sections 21 and the upper area 22-2 of the vibrator 22, and also form the upper area 23-2 of the support section 23 and the upper areas 24a-2 through 24e-2 of the conducting sections 24a through 24e so as to electrically isolate the upper areas 24*a*-2 through 24*e*-2 of the conducting sections 24*a* through 24*e* from the upper area 23-2 of the support section 23, and so that either of the upper area 23-2 of the support section 23 or the upper areas 24*a*-2 through 24*e*-2 of the conducting sections 24*a* through 24*e* extend from above the lower area 23-1 of the support section 23 to above each of the lower areas 24*a*-1 through 24*e*-1 of the conducting sections 24*a* through 24*e*.

Hereinbefore, although the embodiments of the invention are explained in detail with reference to the drawings, these are exemplifications only, and accordingly the invention is not limited to the embodiments. In other words, the invention can be put into practice in other forms obtained by executing various modifications or improvements on the above embodiments based on the knowledge of those skilled in the art.

What is claimed is:

1. A motion sensor comprising:
   a lower substrate having a first electrode section;
   an upper substrate having a second electrode section;
   between the lower and upper substrates, a vibrator movably supported by an elastic beam section, the vibrator having a three-layered structure composed of a first conductive layer, an insulating layer and a second conductive layer;
   between the lower and upper substrates, a support section formed of the first conductive layer, the insulating layer, and the second conductive layer, and supporting the beam section; and
   between the lower and upper substrates, a conducting section separate from the vibrator and formed of the first conductive layer, the insulating layer, and the second conductive layer, the conducting section being electrically isolated from the support section, and connecting the first electrode section to the upper substrate,
   wherein,
      the vibrator and conducting section are located within and are surrounded by said support section,
      displacement of the vibrator is detected by the first electrode section and the second electrode section to detect angular velocity or acceleration or both, and
      the second conductive layer is provided so as to straddle the conducting section and the support section and to provide secondary support to the conducting section.

2. A motion sensor comprising:
   a lower substrate having a first electrode section;
   an upper substrate having a second electrode section;
   an intermediate substrate between the lower and upper substrates and having a three-layered structure composed of a first conductive layer, an insulating layer, and a second conductive layer between the lower substrate and the upper substrate;
   a vibrator made of an electrically isolated section of the intermediate substrate;
   an elastic beam section movably supporting the vibrator;
   a support section made of another section of the intermediate substrate and formed of the first conductive layer, the insulating layer, and the second conductive layer, the support section configured to support the beam section; and
   a conducting section made of another section of the intermediate substrate and comprised of the first conductive layer, the insulating layer, and the second conductive layer, the conducting section being electrically isolated from the support section, and configured to connect the first electrode section to the upper substrate,
   wherein,
      the vibrator and conducting section are located within and are surrounded by the support section,
      displacement of the vibrator is detected by the first electrode section and the second electrode section to detect angular velocity or acceleration or both,
      the conducting section is supported by the second conductive layer extending from the support section, and
      the second conductive layer is formed so as to straddle the conducting section and the support section and to provide secondary support to the conducting section.

3. A method of manufacturing a motion sensor having a lower substrate having (1) a first electrode section, (2) an upper substrate having a second electrode section, and (3) an intermediate substrate between the upper and lower substrates, the intermediate substrate having a three-layered structure composed of a first conductive layer, an insulating layer, and a second conductive layer between the lower substrate and the upper substrate, the intermediate substrate including a vibrator movably supported by an elastic beam, a support section for supporting the beam, and a conducting section for connecting the first electrode section to the upper substrate, the vibrator and conducting section being located within and surrounded by the support section, whereby a displacement of the vibrator is detected with the first electrode section and the second electrode section to detect angular velocity or acceleration or both, the method comprising the steps of:
   patterning the first conductive layer to form a lower area of the vibrator, a lower area of the support section, and a lower area of the conducting section separated from each other;
   patterning the second conductive layer to form an area of the beam section and an upper area of the vibrator, and to form an upper area of the support section and an upper area of the conducting section so as to be electrically isolated from each other, and so that either the upper area of the support section or the upper area of the conducting section extends from above the lower area of the support section to above the lower area of the conducting section so as to straddle both the support section and the conducting section and to provide secondary support to the conducting section; and
   bonding the lower substrate and the upper substrate with the intermediate substrate.

* * * * *